March 25, 1947. J. S. STEWART 2,418,100
MACHINE FOR MAKING PLYWOOD IN CURVED SHAPES
Filed Jan. 22, 1943 3 Sheets-Sheet 1

INVENTOR.
JAMES S. STEWART,
Hazard & Miller
ATTORNEY.

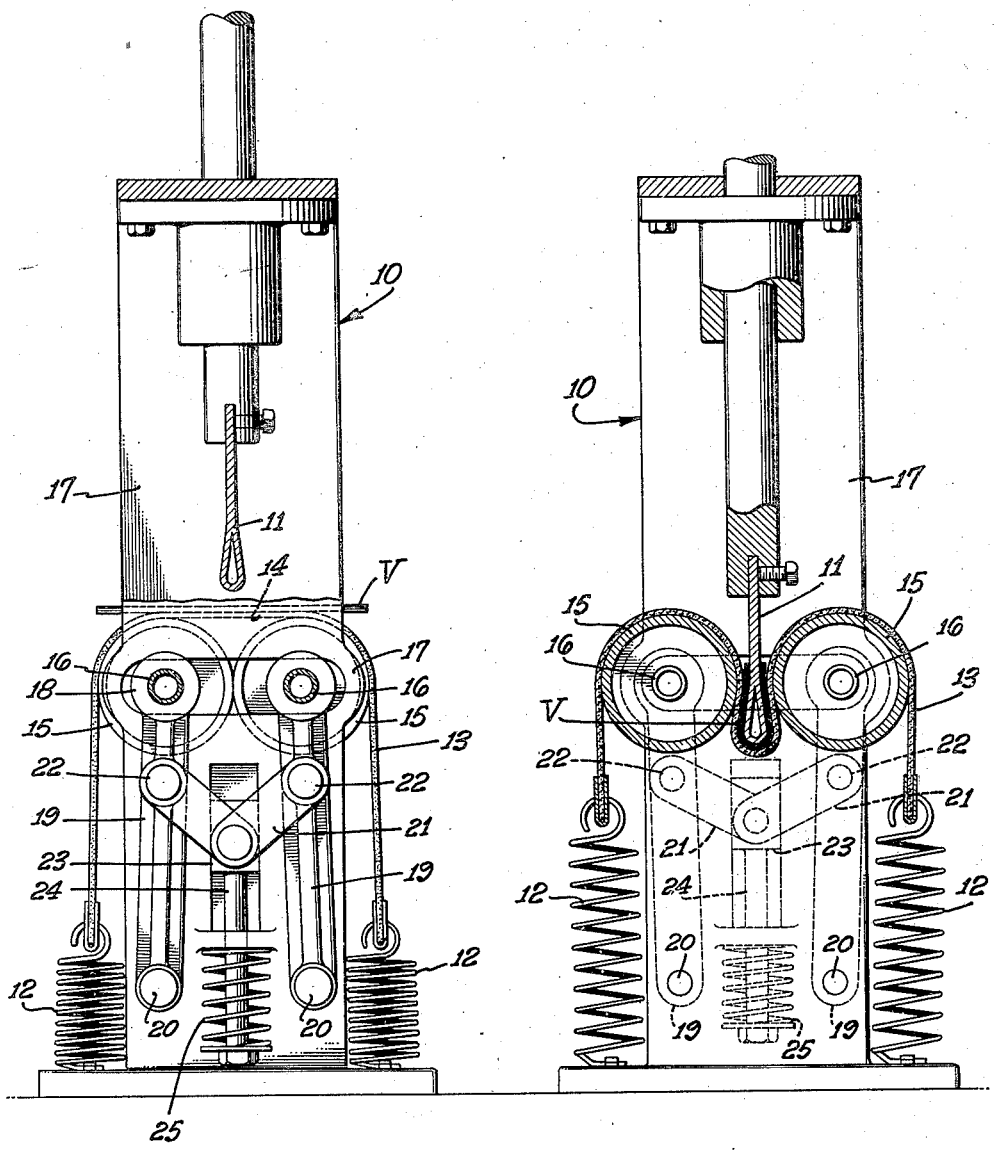

INVENTOR.
JAMES S. STEWART,
BY Hazard & Miller
ATTORNEY.

Patented Mar. 25, 1947

2,418,100

UNITED STATES PATENT OFFICE 2,418,100

MACHINE FOR MAKING PLYWOOD IN CURVED SHAPES

James S. Stewart, Portland, Oreg., assignor to Curved Plywood Products Co., Portland, Oreg., a corporation of Nevada Application January 22, 1943, Serial No. 473,209

3 Claims. (Cl. 144—254)

This invention relates to a machine for making plywood in curved or bent shapes.

An object of the invention is to provide a machine providing a flexible but normally flat support on which the layers of veneer and bonding material can be suitably stacked with a die arranged on one side of the support and a means for applying heat and pressure on the other side of the support whereby, as the die is forced toward the layers of veneer and bonding material, the veneer will be bent by the flexible support around the sides of the die and the support and veneer will be carried by the die between the heat and pressure applying means, whereby the bonding material may be heated under pressure and caused to set in the curved shape conforming to the shape of the die.

Another object of the invention is to provide a machine for making plywood in curved or bent shapes which is of relatively simple, durable, and inexpensive construction having relatively few moving parts and which is simple and efficient in operation.

With the foregoing and other objects in view, which will be made manifest in the following detailed description and specifically pointed out in the appended claims, reference is had to the accompanying drawings for an illustrative embodiment of the invention, wherein:

Fig. 2 is a sectional view taken substantially upon the line 2—2 in the direction indicated, the die being illustrated in elevated position wherein the flexible support is horizontal and has positioned thereon the layers of veneer that are to be bonded together to form the curved plywood structure;

Fig. 3 is a view taken substantially upon the line 3—3 upon Fig. 1, illustrating the die as having carried the veneer and flexible support between the heated rollers of the machine so that heat and pressure may be applied to the veneer in causing it to set in a shape conforming to the shape of the die;

Figure 1:
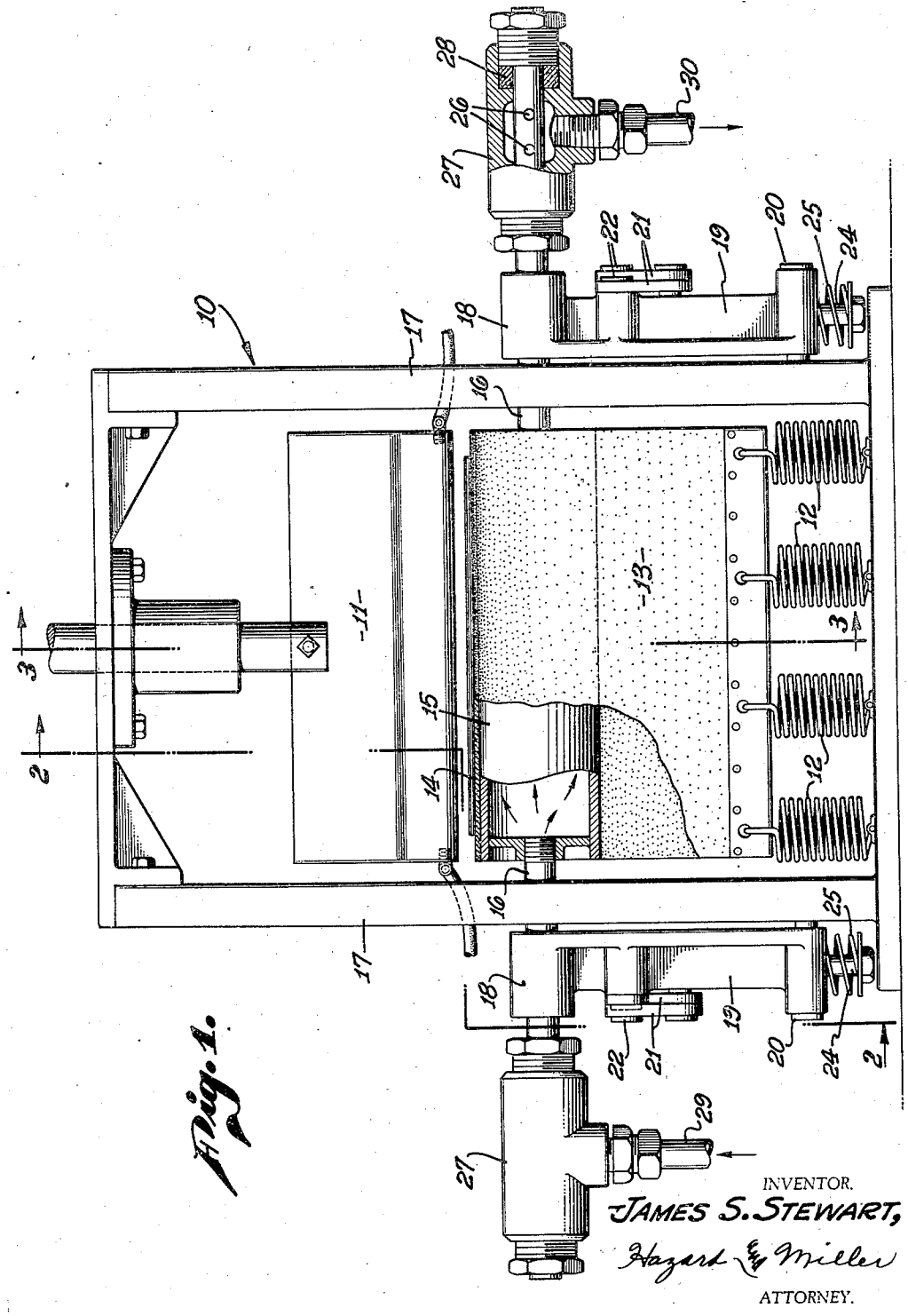
Figure 1 is a view in elevation parts being broken away in section illustrating one side of the machine embodying the present invention.

Referring to the accompanying drawings wherein similar reference characters designate similar parts throughout, the improved machine comprises a suitable frame, generally indicated at 10, in which there is vertically reciprocable a die 11 that conforms in cross sectional shape to the shape that it is desired to impart to the finished plywood. In the construction illustrated, the die is shown as being of such shape as to impart to the plywood a substantially U-shaped cross section, although it will be appreciated that the die may be given any desired cross sectional shape such as for example, a V-shape or an angular shape that will produce plywood in angular cross section. At the front and back of the frame on the base thereof there are tension springs 12 which are connected to a flexible belt 13, the horizontal reach 14 of which provides a flexible horizontal support for the layers of veneer V. These layers are stacked on the horizontal reach 14 in superposed relationship and have the bonding material, which is preferably one that permanently sets under the influence of heat, disposed therebetween. In conformity with the conventional manner of manufacturing plywood, alternate layers of veneer may have their grain running in substantially the same direction and intermediate layers have their grain arranged at a decided angle to the grain of the alternate layers. Such an angle may be at right angles or at 60°.

The belt 13 which is maintained under tension by the springs 12 is supported by hollow rolls 15 having hollow trunnions 16 which extend through supports 17 in the sides of the frame and through bearings 18 on arms 19 that are pivoted on the frame as at 20. Each arm 19 of a pair has links 21 pivotally mounted thereto as at 22, and these links are connected to a common crosshead 23 slidable in the end of the frame. The crossheads 23 have stems 24 extending downwardly therefrom and these stems are urged downwardly by means of springs 25. The outer ends of the hollow trunnions are perforated as at 26 and the perforated portions are surrounded by T fittings 27 that are equipped with stuffing boxes 28. Steam or other heating medium may be introduced through a supply pipe 29 and after passing through the hollow trunnions and the rolls 15 is exhausted through an exhaust pipe 30.

The die 11 is vertically reciprocated by any suitable source of power which may be either a pneumatically or hydraulically actuated piston or a leverage arrangement. Neither of such mechanisms are illustrated as any construction capable of forcing the die 11 downwardly may be employed.

The operation and advantages of the above-described construction are as follows. In the normal position the belt occupies the position shown in Fig. 2, wherein the spring 25 is effective upon the crosshead 23 to draw the rolls 15 toward each other and into engagement. The center reach 14 is substantially horizontal and the layers of veneer and bonding material may be stacked in superposed relationship on the belt. When sufficient layers have been applied, the die 11 is then forced downwardly into engagement with the veneer layers and the reach 14 is forced downwardly between the opposed rolls 15, thus bending or folding the veneer layers around the sides of the die as shown in Fig. 3. At the same time the belt which is kept under tension is bent around the folded veneer and the spring 25 is effective to cause the rollers to press the sides of the belt against the upwardly bent sides of the veneer. The steam passing through the rollers causes the veneer to be heated while it is maintained under this pressure of both the belt and of the rollers. When the veneer has been heated sufficiently to cause the bonding material to set the die is elevated clear of the belt and the curved plywood section is removed from the die. The die 11 may be hollow as shown and the internal cavity supplied with steam through conduits connected thereto so as to heat the same. It is not essential in all instances that the die be heated but it is preferable. Other heating means, such as an electric heating element, may be incorporated in the die 11 if desired.

Figure 4:
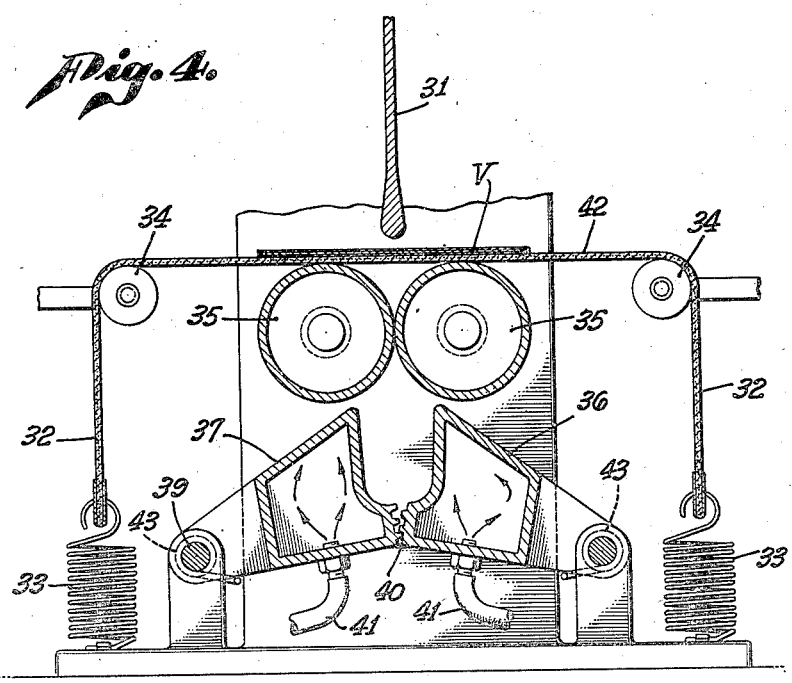
Fig. 4 is a partial view in vertical section similar to Fig. 2, illustrating a slightly modified form of construction.
Figure 5:
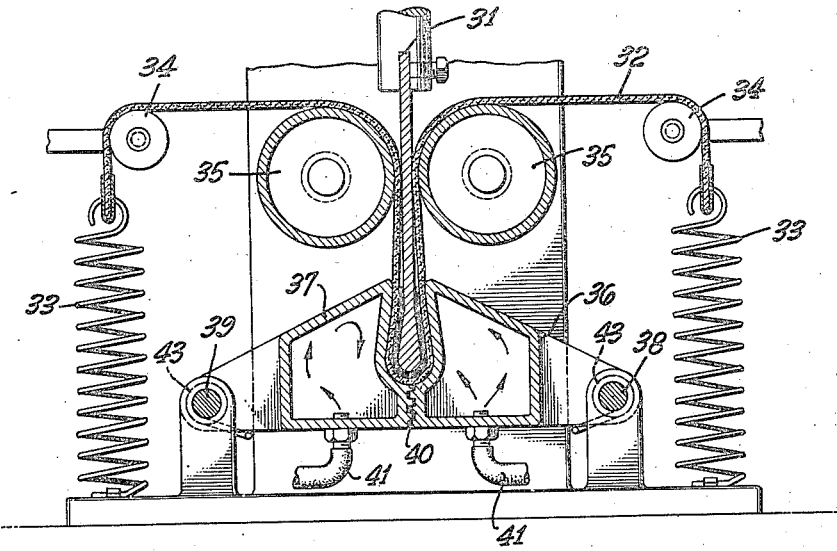
Fig. 5 is a sectional view illustrating the modified form in that position wherein the set of the plywood is taking place.

In the construction illustrated in Figs. 4 and 5, the die is indicated at 31. The belt 32 is maintained under tension by tension springs 33. It is trained over idler rolls 34 and over rolls 35 which may be similar to the rolls 15. These rolls are similar to rolls 15, above described, having the same type of supporting structure and being similarly urged towards each other. These rolls may or may not be heated. Below these rolls there are opposed hollow jaws 36 and 37, these being pivoted respectively at 38 and 39. The jaws 36 and 37 have engaging gear teeth 40 and steam or other heating medium may be supplied thereto through conduits 41.

In this form of construction the veneer and bonding material indicated at V is stacked on the horizontal reach 42 of the tension belt 32 in the same manner as that previously described. The die 31 is then forced downwardly between the rolls 35 causing the veneer to be bent upwardly against the sides of the die by the pressure of the belt 32 and the rolls 35. The die, however, is forced downwardly between the rolls 35 and is caused to enter between the opposed jaws 36 and 37. These jaws which are normally urged into upper or open position by springs 43 are engaged by the die and the veneer and belting thereabout, and are forced downwardly. The meshing teeth 40 cause the jaws to move downwardly in unison and to contract on the belt to press the veneer firmly against the sides of the die as shown in Fig. 5. While in this position the bonding material becomes heated, and on setting, the die is withdrawn to the position shown in Fig. 4, in which position the curved plywood shape may be removed from the die.

In this form of construction the die may be hollow to enable it to be heated if desired. However, normally in this form of construction inasmuch as the plywood is usually adequately heated by the surrounding jaws heating of the die is ordinarily not necessary.

From the above-described constructions it will be appreciated that the improved machine provides a convenient flexible but normally horizontal support on which the veneer layers may be arranged and stacked. When these veneer layers have been so stacked the die carries the veneer layers and the flexible support down between pressure applying elements which are caused to simultaneously and uniformly act to apply equal pressure to opposite sides of the veneer through the flexed belt. While in this position wherein the pressure is being maintained and distributed, the bonding material and veneer can be heated causing the bonding material to set.

Various changes may be made in the details of construction without departing from the spirit or scope of the invention as defined by the appended claims.

I claim:

1. A machine for making plywood in curved shapes comprising a die shaped to conform to the desired shape of the plywood, a flexible belt adjacent the die on which layers of veneer and bonding material may be positioned, means for holding the belt taut, means for forcing the die toward the belt to cause the belt to press the veneer against the die, opposed rolls on the opposite side of the belt from the die, and means for urging the rolls toward each other whereby, when the die is forced against the veneer the veneer and belt will be carried thereby between the rolls.

2. A machine for making plywood in curved shapes comprising a die shaped to conform to the desired shape of the plywood, a flexible belt adjacent the die on which layers of veneer and bonding material may be positioned, means for holding the belt taut, means for forcing the die toward the belt to cause the belt to press the veneer against the die, opposed rolls on the opposite side of the belt from the die, means for urging the rolls toward each other whereby, when the die is forced against the veneer the veneer and belt will be carried thereby between the rolls, and means for heating the rolls.

3. A machine for making plywood in curved shapes comprising a die shaped to conform to the desired shape of the plywood, a tension belt adjacent the die on which layers of veneer and bonding material may be positioned, a pair of opposed rolls on which the tension belt is supported, means pivotally supporting the rolls, a crosshead, links connecting the crosshead to the roll supporting means to cause the rolls to move toward each other and to separate in unison when the crosshead is moved in opposite direction, means urging the crosshead into a position drawing the rolls toward each other, and means for forcing the die toward the tension belt and causing it to carry the veneer and tension belt between the rolls.

JAMES S. STEWART.

REFERENCES CITED

The following references are of record in the file of this patent:

UNITED STATES PATENTS

| Number | Name | Date |
| --- | --- | --- |
| 1,507,368 | Elliott | Sept. 2, 1924 |
| 1,982,447 | Nash | Nov. 27, 1934 |
| 503,292 | Niedringhaus et al. | Aug. 15, 1893 |
| 596,645 | Woodward et al. | Jan. 4, 1898 |
| 659,111 | Soper | Oct. 2, 1900 |

(Other references on following page)

| Number | Name | Date |
|---|---|---|
| 584,212 | Dolge | June 8, 1897 |
| 954,848 | Bason | Apr. 12, 1910 |
| 220,229 | Flora | Oct. 7, 1879 |
| 245,187 | Luckhaupt | Aug. 2, 1881 |
| 1,052,405 | Breece | Feb. 4, 1913 |
| Re. 21,479 | Trabucco | June 4, 1940 |
| 171,376 | Griffiths | Dec. 21, 1875 |
| 2,009,265 | Hirschfield | July 23, 1935 |
| 1,902,742 | Wentink | Mar. 21, 1933 |
| 541,890 | Stickley | July 2, 1895 |

FOREIGN PATENTS

| Number | Country | Date |
|---|---|---|
| 418,982 | British | Nov. 5, 1934 |
| 103,224 | German | June 9, 1899 |
| 585,691 | German | Oct. 7, 1933 |